(12) United States Patent
Paris

(10) Patent No.: US 12,703,309 B2
(45) Date of Patent: Aug. 11, 2026

(54) TRIM ELEMENT COMPRISING A MOBILE ELEMENT AND A WIRE ELEMENT MOVABLE WITH THE MOBILE ELEMENT

(71) Applicant: FAURECIA INTERIEUR INDUSTRIE, Nanterre (FR)

(72) Inventor: Jean-François Paris, Meru (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 405 days.

(21) Appl. No.: 18/373,227

(22) Filed: Sep. 26, 2023

(65) Prior Publication Data

US 2024/0101046 A1 Mar. 28, 2024

(30) Foreign Application Priority Data

Sep. 26, 2022 (FR) ................................ FR 22 09734

(51) Int. Cl.

*B60R 13/02* (2006.01)
*B60R 16/02* (2006.01)
*H02G 3/36* (2006.01)

(52) U.S. Cl.

CPC .......... *B60R 13/02* (2013.01); *B60R 16/0215* (2013.01); *H02G 3/36* (2013.01)

(58) Field of Classification Search

CPC ... B60R 16/027; B60R 16/0215; B60R 13/02; H02G 3/36
USPC ........................................................ 296/1.08
See application file for complete search history.

(56) References Cited

U.S. PATENT DOCUMENTS 5,556,059 A * 9/1996 Maeda ................ B60R 16/0215 174/72 A
5,994,645 A 11/1999 Suzuki et al.
6,870,104 B2 3/2005 Tsunoda et al.
8,091,949 B2 1/2012 Toyozumi
8,668,253 B2 3/2014 Bauer
2006/0108823 A1* 5/2006 Schmidt .............. B60R 11/0264 296/70
2006/0166557 A1* 7/2006 Ishikawa .................. B60R 7/04 439/607.41
2007/0216181 A1 9/2007 Schmidt et al.

OTHER PUBLICATIONS

French Search Report corresponding to application FR2209734, dated Mar. 20, 2023, 2 pages.

* cited by examiner

*Primary Examiner* — Caroline N Butcher
(74) *Attorney, Agent, or Firm* — Reising Ethington P.C.

(57) ABSTRACT

A trim element having a wire element and a guiding device. A mobile portion of the wire element moves between a deployed position, wherein the mobile portion extends along a first path, and a retracted position, wherein the mobile portion extends along a second path. The guiding device includes a guide surface, with the mobile portion being separated from the guide surface in the deployed position and matching the shape of the guide surface in the retracted position. The guiding device has a constraint element movable between a separated position and a constraint position, wherein the constraint element moves the mobile portion toward the guide surface.

9 Claims, 2 Drawing Sheets

TRIM ELEMENT COMPRISING A MOBILE ELEMENT AND A WIRE ELEMENT MOVABLE WITH THE MOBILE ELEMENT

TECHNICAL FIELD

The present invention relates to a vehicle trim element of the type comprising a body, an element that is mobile relative to the body, at least one wire element and at least one device for guiding the wire element, at least one mobile portion of the wire element moving with the mobile element when said mobile element moves relative to the body, the mobile portion moving between a deployed position, wherein said mobile portion extends along a first path, and a retracted position, wherein said mobile portion extends along a second path different from the first path, the guiding device comprising at least one guide surface extending along at least one part of the second path, at least part of the mobile portion of the wire element being spaced away from said guide surface in the deployed position and substantially matching the shape of said guide surface in the retracted position.

BACKGROUND

In a vehicle trim element, such as a central console, it is known to provide a mobile element, such as an armrest, the position of which is adjustable to improve passenger comfort and/or the ergonomics of the trim element.

A wire element may also be provided to extend into the body and the mobile element of the trim element and to move with the mobile element relative to the body. Such a wire element is for example an electrical cable, a bundle of electrical cables, an optical fiber or other.

Thus, such an electrical cable makes it possible, for example, to electrically connect an electronic apparatus, such as a screen, a tablet, a charger, a roaming device or other, received in the mobile element, to the electronic system of the vehicle.

Since the wire element moves with the mobile element, the wire element must have a length sufficient to accompany the mobile element to an extreme position relative to the body and the wire element changes path, for example by folding back on itself, when the mobile element moves from its end position to a close position closer to the body, wherein the useful length of the wire element is reduced. Thus, the wire element changes path with each movement of the mobile element, and these repeated changes can cause damage to the wire element over time until the wire element malfunctions, or even breaks.

To overcome this drawback, it has been proposed to add a guide element to guide the path of the wire element into its retracted position and thus better control the shape adopted by the wire element in the retracted position and reduce the stresses on the wire element during its numerous movements.

However, such a guide element is not entirely satisfactory because the wire element can move away from the path imposed in the retracted position or not follow same, in particular when the wire element lacks flexibility, as is the case for example of a sheathed electrical cable.

SUMMARY

One of the aims of the invention is to overcome these disadvantages by proposing a trim element comprising a mobile element provided with a wire element whose operation is reliable and has a great service life.

To this end, the invention relates to a trim element of the aforementioned type, wherein the guiding device further comprises at least one constraint element movable between a separated position when the mobile portion of the wire element is in the deployed position, and a constraint position, wherein the constraint element moves at least part of the mobile portion toward the guide surface so that it matches the shape of said guide surface in the retracted position of the mobile portion.

The constraint element makes it possible to direct the wire element in order to ensure that the latter follows the second path in the retracted position. Thus, the wire element always adopts the same shape in the deployed position and in the retracted position, even after a large number of movements of the mobile element, which reduces the wear of the wire element, extends the service life and makes the trim element more reliable.

The trim element may comprise one or more of the following features, taken alone or according to any technically feasible combination:

- the constraint element is resiliently deformable between the separated position and the constraint position, the wire element urging the constraint element to the separated position when the mobile portion of the wire element is in the deployed position;
- the constraint element is a spring formed by a plate having a shape substantially complementary to at least part of the guide surface;
- the first path is substantially straight;
- the second path is curved and comprises at least one change of direction of the mobile portion of the wire element;
- the guide surface and the constraint element extend on either side of the wire element, the constraint element being separated from the guide surface in the separated position and being brought closer to the guide surface in the constraint position;
- the guide surface and/or the constraint element of the guiding device are integral with the body or the mobile element of the trim element;
- the wire element comprises at least one fixed portion attached to the body of the trim element;
- the wire element comprises at least electrical cable, at least part of which extends into the body and another part extends into the mobile element;
- the body is a central vehicle console and the mobile element is a vehicle armrest.

BRIEF DESCRIPTION OF THE DRAWINGS

Other aspects and advantages of the invention will appear on reading the following description, given by way of example and made with reference to the appended drawings, wherein.

DETAILED DESCRIPTION

Figure 1:
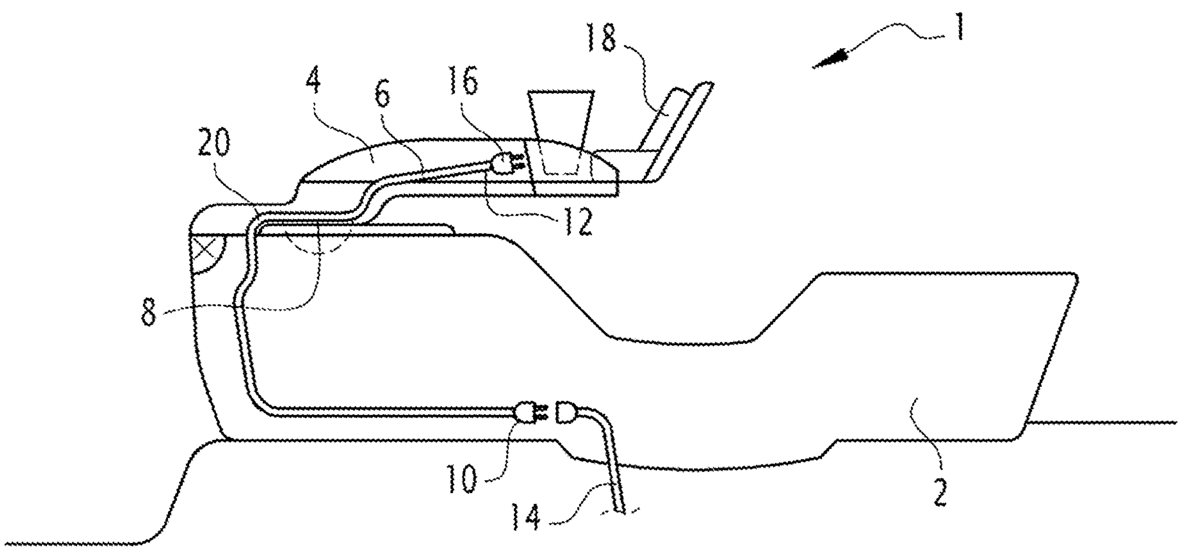
FIG. 1 is a schematic cross-section view of a trim element according to one embodiment the invention.

Referring to FIG. 1, a trim element 1 comprising a body 2 and a mobile element 4 can be described, movable relative to the body 2. According to the example shown in FIG. 1, the body 2 is a central vehicle console and the mobile element 4 is an armrest movable relative to the body 2, for example to move it forward or backward in the passenger compartment of the vehicle. According to a second example, the body 2 is a vehicle floor or a rail and the mobile element 4 is a seat movable relative to the body 2, for example to move it forward or backward it in the passenger compartment of the vehicle. It is understood that the invention also applies to other types of trim elements, such as a door panel, a dashboard or other, and/or mobile elements, such as a support tablet, a glove box, a console body movable relative to the floor, a sliding door, an opening roof or the like.

The trim element further comprises at least one wire element 6 extending into the body 2 and into the mobile element 4. Thus, the wire element 6 comprises at least one mobile portion 8 moving with the mobile element 4 when the latter moves relative to the body. "Mobile portion" is understood to mean any part of the wire element 6 which moves or deforms due to the movement of the mobile element 4 relative to the body 2. According to the embodiment shown in FIG. 1, the wire element 6 is an electrical cable extending between an input 10, extending in or near the body 2, and an output 12, extending into the mobile element 4 and moving with it.

The remainder of the description will be made with reference to such an electrical cable, but it is understood that the invention applies to other types of wire elements, such as an optical fiber, a mechanical cable, a data bus, a bundle of several electrical cables, a bundle of several optical fibers, a bundle comprising electrical cables and optical fibers, etc.

The input 10 of the wire element 6 is for example electrically connected to the electronic system 14 of the vehicle, as shown in FIG. 1, or the wire element 6 is part of the electronic system 14.

The output 12 of the wire element is for example electrically connected to a connector 16 intended to be connected to an electronic apparatus 18 received in the mobile element 4, as shown in FIG. 1, or integrated therewith. Such an electronic apparatus 18 can be of any type, for example a screen, a tablet, a charger, a roaming device or the like. Thus, the wire element 6 makes it possible to electrically connect the electronic apparatus 18 to the electronic system 14 of the vehicle. The wire element 6 can be used to supply electricity and/or to control the electronic apparatus 18 and/or to transmit information from the electronic apparatus 18 to the electronic system 14 of the vehicle. It is understood that the nature of the object connected to the wire element 6 may be different depending on the nature of the wire element 6. As mentioned above, the electronic apparatus 18 or any other device connected to the wire element 6 may be integrated into the mobile element 4, that is to say permanently fixed thereon, or may be a portable apparatus or device, that is to say that it can be received in the mobile element 4 and be removed for use outside the trim element.

The wire element 6 comprises at least one fixed portion 20 attached to the body 2 of the trim element 1. In other words, the movement of the mobile element 4 does not cause the entire wire element 6 to move, as its fixed portion 20 remains immobile during this movement. Thus, the mobile portion 8 of the wire element 6 moves relative to the fixed portion 20 when the mobile element 4 moves relative to the body 2. The fixed portion 20 extends between the input 10 and the output 12 of the wire element 6 and the mobile portion 8 extends between the fixed portion 20 and the output 12 of the wire element 6. According to one embodiment, the wire element 6 is attached to the body over its entire length to the mobile portion 8, the mobile portion 8 remaining free to move with the mobile element 4. Alternatively, the wire element 6 is attached to the body 2 in several locations spaced apart from each other along the wire element 6, for example by means of clips, all the way to the mobile portion 8.

Figure 2:
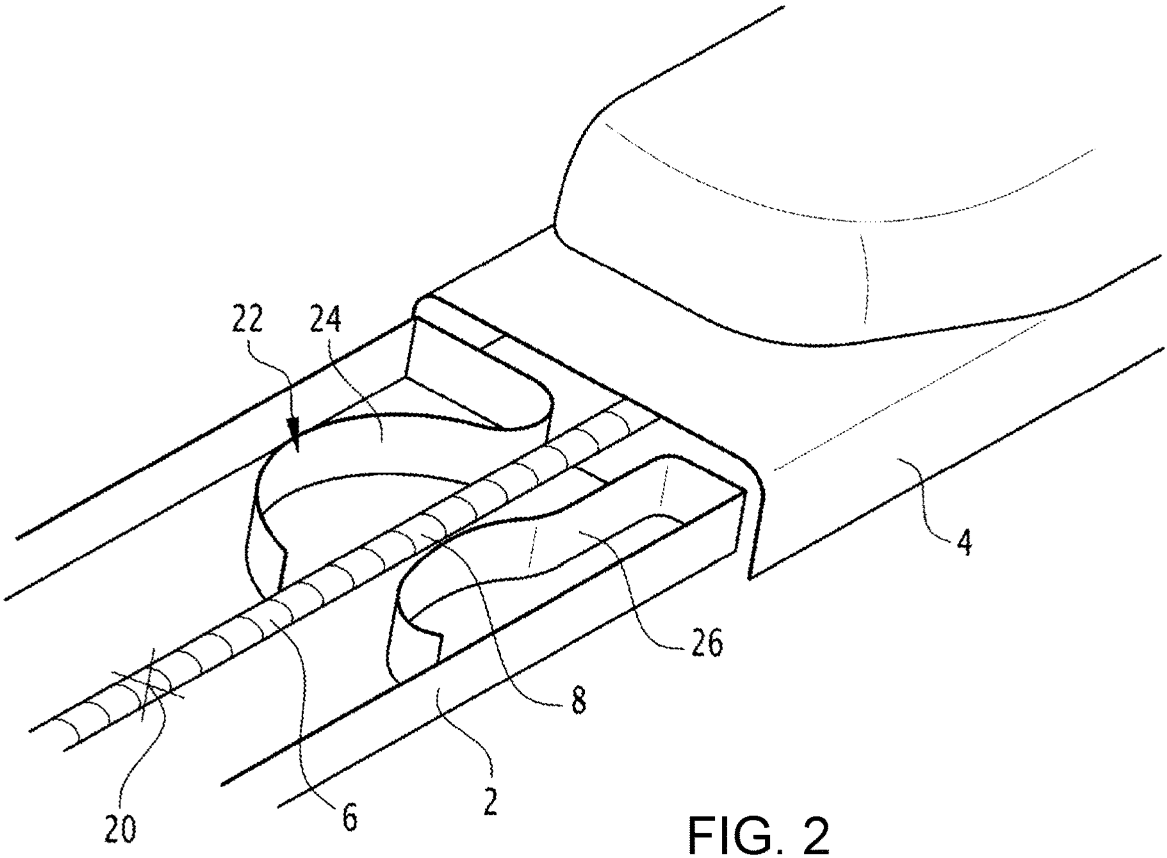
FIG. 2 is a schematic perspective view of the trim element of FIG. 1, with the wire element being in a deployed position.
Figure 3:
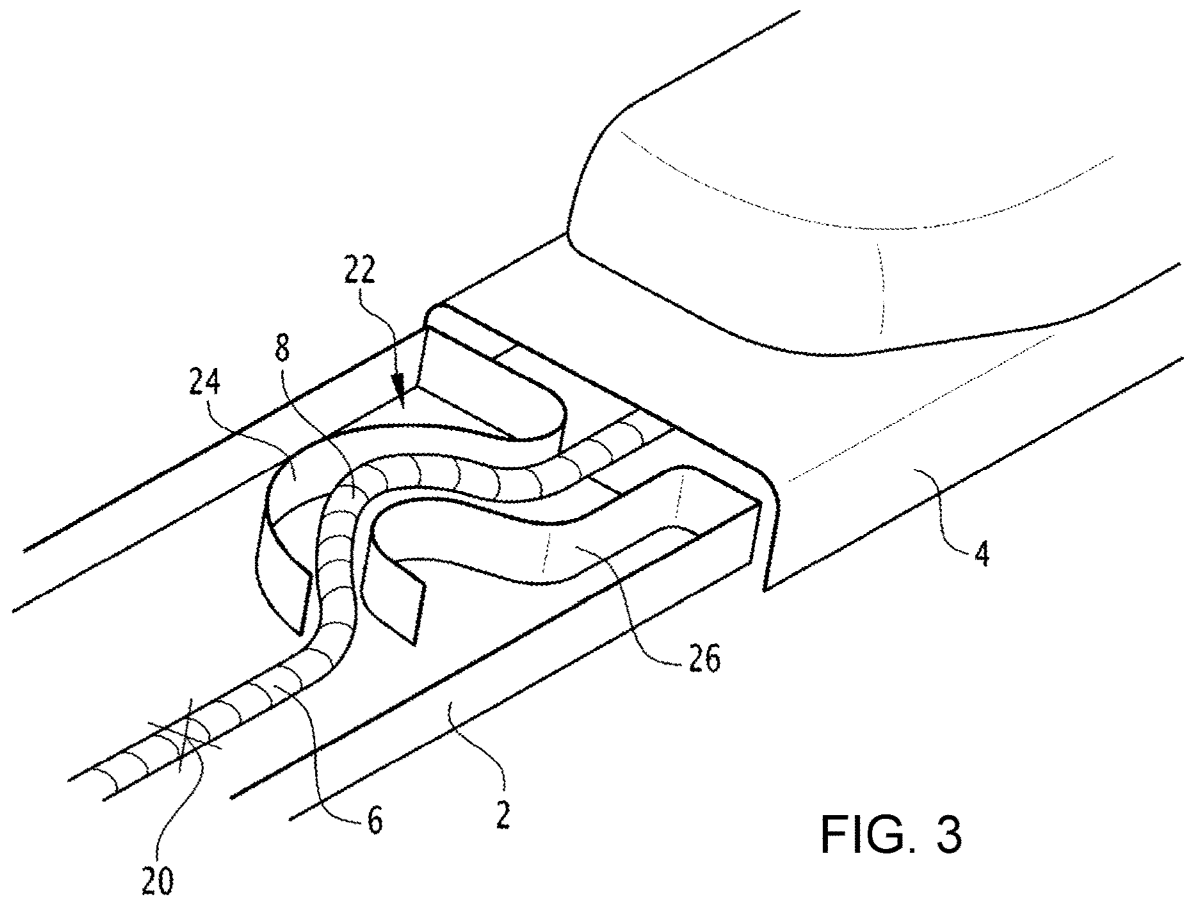
FIG. 3 is a schematic perspective view of the trim element of FIG. 2, with the wire element being in a retracted position.

The mobile portion 8 can be moved between a deployed position, shown in FIG. 2, and a retracted position, shown in FIG. 3. The deployed position corresponds to an extreme position of the mobile element 4, wherein the necessary length of wire element 6 for connecting the apparatus 18 to the electronic system 14 is the greatest, while the retracted position corresponds to another extreme position of the mobile element 4, wherein the necessary length of wire element 6 for connecting the apparatus 18 to the electronic system 14 is the lowest. In other words, part of the length of the wire element 6 is only present so that the wire element is long enough to ensure the connection between the apparatus 18 and the electronic system 14 in the deployed position. This part of the length of the wire element 6 is not "useful" and must be "stored" in the retracted position.

To this end, the trim element 1 further comprises a guiding device 22, visible in FIGS. 2 and 3, through which at least part of the mobile portion 8 passes, this part extending locally between the fixed portion 20 and the output 12.

The guiding device 22 is arranged to determine the position and shape of the mobile portion 8 in the retracted position in order to manage the surplus length of wire element 6 in that position. In other words, the guiding device 22 is arranged to modify the shape of at least part of the mobile portion 8 during the movement from the deployed position to the retracted position. The shape of the mobile portion 8 is understood to mean the path along which this mobile portion 8 extends. Thus, the mobile portion 8 extends along a first path, shown in FIG. 2, in the deployed position and along a second path, shown in FIG. 3, in the retracted position, the second path being different from the first path.

The first path is for example substantially straight, which corresponds to a wire element 6 stretched or almost taut, in order to optimize the length of the wire element 6 in the deployed position, wherein this length is most necessary, as mentioned above.

The second path is for example curved, that is it comprises at least one direction change, preferably at least two direction changes. Thus, according to the embodiment shown in FIG. 3, the mobile portion 8 extending into the guiding device 22 is substantially arc-shaped. It is understood that other shapes can be envisaged, for example an S or other shape, in particular as a function of the "non-useful" length of the wire element 6 in the retracted position. The dimensions of the second path, such as the length of the mobile portion 8 extending in a direction different from the rectilinear direction of the first path, are also chosen as a function of this "non-useful" length.

In order for the mobile portion 8 to adopt the desired shape in the retracted position, the guiding device comprises at least one guide surface 24 having the shape of at least part of the second path, that is to say that the guide surface 24 extends along at least part of the second path. At least part of the mobile portion 8 is applied against the guide surface 24, or matches the shape thereof, in the retracted position, as shown in FIG. 3. In the deployed position, this part of the mobile portion 8 is separated from the guide surface 24, as shown in FIG. 2. For more complex shapes and/or for moving portions 8 of particularly significant length, a plurality of guide surfaces 24 distributed along the mobile portion 8 of the wire element 6 can be provided, for example on either side of the wire element 6. Thus, the second path may have a more complex shape than a simple curve.

In order to ensure that the mobile portion 8 adopts the change of shape to extend according to the second path, the guiding device 22 further comprises at least one constraint element 26 movable between a separated position, shown in FIG. 2, and a constraint position, shown in FIG. 3. The guide surface 24 and the constraint element 26 extend on either side of the wire element 6 so that at least part of the mobile portion 8 of the wire element passes between the guide surface 24 and the constraint element 26, as shown in FIGS. 2 and 3.

The constraint element 26 is in the separated position when the mobile portion 8 is in the deployed position. In this position, the constraint element 26 is separated from the guide surface 24 so as to leave a passage to the mobile portion 8 of the wire element 6 sufficient for the mobile portion 8 to extend along the first path without interfering with the guide surface 24.

The constraint element 26 is in the constraint position when the mobile portion 8 is in the retracted position. In this position, the constraint element 26 is brought closer to the guide surface 24 so as to move the part of the mobile portion 8 between the guide surface 24 and the constraint element 26 toward the guide surface 24 and force that part to match the shape of the guide surface 24. Thus, in the constraint position, the constraint element 26 positions the mobile portion 8 so that it extends along the second path To control the movement of the constraint element 26 between the separated and constraint positions, the constraint element 26 is for example resiliently deformable and constrained by the wire element 6 in its separated position when the wire element 6 is in the deployed position, as shown in FIG. 2. Thus, when the wire element 6 extends along the first path, it presses on the constraint element 26 and puts it into the separated position. This positioning is done simply by moving the mobile element 4 of the trim element towards its end position furthest from the body 2, which at the same time moves the mobile part 8 of the wire element 6 towards its deployed position. When the mobile element 4 is returned to its end position closer to the body 2, the wire element 6 releases its stress on the constraint element 26 and the latter moves towards its constraint position due to its elasticity, which moves the mobile portion 8 towards its retracted position. Thus, the movement of the mobile portion 8 between its retracted and deployed positions is done simply by moving the mobile element 4 and does not require specific actuation of the constraint element.

The constraint element comprises for example a spring and is for example made of metal and/or of plastic. According to one embodiment, the constraint element 26 is a spring made in the form of a plate having a shape substantially complementary to at least part of the guide surface 24.

According to one embodiment, the constraint element 26 is thus formed by a leaf spring. Such a leaf spring is formed by a metal spring in the form of a plate. Such a leaf spring makes it possible to simply perform the function of the constraint element, its shape also participating in the shaping of the part of the mobile portion 8 with which it is in contact in order to place the mobile portion 8 in the retracted position.

According to an embodiment shown in FIGS. 2 and 3, the constraint element 26 is formed by a spring in the form of a plate made of the same material as the body 2 or mobile element 4, in which case the constraint element may be integral with the body 2 or with the mobile element 4, as will now be described. This embodiment also allows the constraint element 26 to participate in the shaping of the part of the mobile portion 8 with which it is in contact in order to put the mobile portion 8 into the retracted position.

According to one embodiment, the guide surface 24 and/or the constraint element 26 are integral with the body 2 of the trim element 1, being for example made by molding. The guiding device 22 is for example placed between the rails on which the mobile element slides and the guide surface 24 and/or the constraint element 26 are for example integral with the support of these rails, being for example made by molding. The guide surface 24 and/or the constraint element 26 are also produced by molding with the rest of the part with which they are made of the same material. Alternatively, the guide surface 24 and/or the constraint element 26 may be integral with the mobile element 4, being for example made by molding. The molding is for example injection molding.

It is understood that other shapes of constraint elements 26 can be envisaged, for example a simple pin arranged to push part of the mobile portion 8 toward the guide surface 24, for example under the effect of the expansion of a spring, for example a compression spring. The rest of the mobile portion 8 then adopts the shape of the second path due to its deformability. According to another variant, the constraint element 26 can be formed by a piston with an actuation dedicated to the movement of the constraint element 26 between the separated and constraint positions. In this case, the constraint element 26 is for example formed by an element attached to the body 2 or to the mobile element 4.

It is also understood that the constraint element 26 is sized based on the nature of the wire element 6 and of the force necessary to move the latter toward the guide surface 24. Thus, for a wire element 6 with a large or slightly deformable diameter, the constraint element 26 can be formed by a metal spring blade whose stiffness is adapted to move the mobile portion 8 toward its retracted position.

When several spaced-apart guide surfaces 24 are provided, a several constraint elements 26 can also be provided, for example as many constraints as there are guide surfaces, in order to move several parts of the mobile portion 8 toward the various guide surfaces in the retracted position. As a variant or in addition, for a guide surface 24 of large size and having for example a shape comprising a succession of curves, several constraint elements 26 can be provided to move different parts of the mobile portion 8 toward different sections of the guide surface 24 in order to ensure that the mobile portion 8 fully adopts the shape of the second path.

The guiding device 22 described above makes it possible to ensure proper management of the wire element 6 during the various movements of the mobile element 4 relative to the body 2 of the trim element and thus to reduce the wear of the wire element 6. It should be noted that the description has been made with reference to a mobile element 4 moving in translation but the invention also applies to a mobile element 4 movable in rotation relative to the body 2. Furthermore, the guiding device 22 can be arranged in a horizontal part as well as a vertical part of the trim element 1.

The invention claimed is:

1. A vehicle trim element comprising a body, a mobile element relative to the body, at least one wire element and at least one guiding device of the wire element, at least one mobile portion of the wire element moving with the mobile element when said mobile element moves relative to the body, the mobile portion moving between a deployed position, wherein said mobile portion extends along a first path, and a retracted position, wherein said mobile portion extends along a second path different from the first path, the guiding device comprising at least one guide surface extending along at least part of the second path, at least part of the mobile portion of the wire element being separated from said guide surface in the deployed position and substantially matching the shape of said guide surface in the retracted position, wherein the guide device further comprises at least one constraint element movable between a separated position when the mobile portion of the wire element is in the deployed position, and a constraint position, wherein the constraint element moves at least part of the mobile portion toward the guide surface so that it matches the shape of said guide surface in the retracted position of the mobile portion, and wherein the constraint element is resiliently deformable between the separated position and the constraint position, the wire element urging the constraint element to the separated position in the deployed position of the mobile portion of the wire element.

2. The trim element according to claim 1, wherein the constraint element is a spring formed by a plate having a shape substantially complementary to at least part of the guide surface.

3. The trim element according to claim 1, wherein the first path is substantially straight.

4. The trim element according to claim 1, wherein the second path is curved and comprises at least one change in direction of the mobile portion of the wire element.

5. The trim element according to claim 1, wherein the guide surface and the constraint element extend on either side of the wire element, the constraint element being separated from the guide surface in the separated position and being brought closer to the guide surface in the constraint position.

6. The trim element according to claim 1, wherein the guide surface and/or the constraint element of the guiding device are integral with the body or the mobile element of the trim element.

7. The trim element according to claim 1, wherein the wire element comprises at least one fixed portion attached to the body of the trim element.

8. The trim element according to claim 1, wherein the wire element comprises at least electrical cable, at least part of which extends into the body and another part of which extends into the mobile element.

9. The trim element according to claim 1, wherein the body is a central vehicle console and the mobile element is a vehicle armrest.

* * * * *